United States Patent [19]

Prinz

[11] 4,225,239

[45] Sep. 30, 1980

[54] MAGNETO-OPTIC BIAS OF RING LASER USING REFLECTIVE MAGNETO-OPTIC ELEMENT AT NEAR-GRAZING INCIDENCE

[75] Inventor: Gary A. Prinz, Alexandria, Va.

[73] Assignee: The United States of America as represented by the Secretary of the Navy, Washington, D.C.

[21] Appl. No.: 55,100

[22] Filed: Jul. 5, 1979

[51] Int. Cl.$^3$ .............................................. G01C 19/64
[52] U.S. Cl. ................................... 356/350; 356/351
[58] Field of Search ............................... 356/350, 351

[56] References Cited

U.S. PATENT DOCUMENTS 3,851,973  12/1974  Macek .................................. 356/350
3,927,946  12/1975  McClure ............................... 356/350

Primary Examiner—Vincent P. McGraw
Attorney, Agent, or Firm—R. S. Sciascia; Philip Schneider; Melvin L. Crane

[57] ABSTRACT

A method of introducing magneto-optic bias into a ring laser permitting its use as a gyroscope. A Kerr reflective mirror is positioned in one leg of a triangle between reflectors at two vertices so that radiation from a reflector at one of the vertices is reflected at the maximum practical angle of incidence to a reflector at the adjacent vertex. By incorporating the reflective magneto-optic element at near-grazing incidence, full advantage is taken of the dependence of the magneto-optical properties upon angle of incidence.

7 Claims, 3 Drawing Figures

MAGNETO-OPTIC BIAS OF RING LASER USING REFLECTIVE MAGNETO-OPTIC ELEMENT AT NEAR-GRAZING INCIDENCE

BACKGROUND OF THE INVENTION

This invention relates to a ring-laser gyroscope and more particularly to a laser gyro of a triangular type that overcomes "mode lock".

Ring-type lasers employing electromagnetic traveling waves at the optical or near-optical frequencies in a clockwise and counterclockwise direction about a closed path in a principal plane have been used to sense rates of angular motion similar in function to the well-known electromechanical gyro. The principle of the ring-type laser gyro is well known in the art.

Various arrangements of reflective surfaces have been used in an effort to provide a simple, effective laser gyro. The basic operation of a laser gyro has been set forth in an article "Laser Gyro" by Joseph Killpatrick, *IEEE Spectrum*, pps 44–55, October 1967.

One of the basic problems encountered in a ring-type laser gyro is the fact that the two beams tend to mode-lock for very low frequencies, that is, the two waves interfere with each other and each assumes a frequency which is substantially identical to the other. Mode-locking has been overcome by placing a magneto-optic mirror at one corner of an equilateral triangle or by the introduction of a Faraday cell in the optical path that introduces a bias. These systems create other problems which have to be overcome. Different systems for overcoming bias using the Faraday cell have been set forth in U.S. Pat. Nos. 3,862,803 and 3,890,047. These patents use two laser gyros in the same system which present a complicated system. It has been determined that one of the problems involves the properties of the materials employed in the magneto-optic elements. In either system, one wants a high degree of differentiation between the counter-propagating beams, that is, a large magneto-optic effect, and as little attenuation possible. Further, the gyro operation must be stable during operation.

SUMMARY OF THE INVENTION

This invention provides a magneto-optic mirror assembly which is placed within the optical path of a triangular laser gyro between two of its reflective corners. The magneto-optical mirror assembly is positioned relative to the corner reflective surfaces such that the radiation is at near-grazing incidence with the surface of the magneto-optic mirror surface.

DETAILED DESCRIPTION

Figure 1:
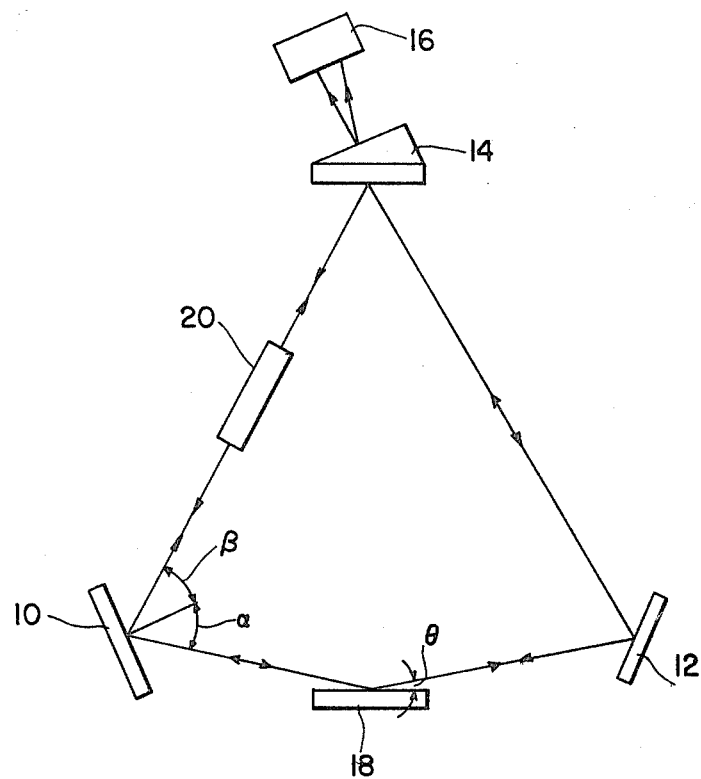
FIG. 1 illustrates a ring laser incorporating an improved reflective surface.

FIG. 1 illustrates a ring-type laser gyro arranged in accordance with the teaching of this invention. The arrangement is in the form of a triangle including two 100% reflectivity mirrors 10 and 12 positioned such that the incident and reflected radiation angles $\alpha$ and $\beta$ are slightly more than 30 degrees. The other corner has a reflectivity mirror readout prism combination 14 which reflects substantially all of the incident radiation while passing a small amount of radiation which is directed to a detector 16 for determining direction. Such devices are well known in the art. A large Kerr magneto-optic-effect reflective element 18 is placed equidistant between mirrors 10 and 12 such that incident and reflected radiation is at a grazing angle $\theta$. The grazing angle $\theta$ is from about 3 degrees to about 25 degrees with the preferred angle being less than 10 degrees for a thin iron film having a thickness of from 200 Å to 800 Å on a $SiO_2$ substrate surface with a $SiO_2$ overcoat having an index of refraction $n = 1.457$.

A laser gain medium 20 is maintained in the optical path either by insertion of a separate discharge tube, or by forming the complete optical path as a hollow passage through a solid block of thermally stable insulating material, and maintaining a gas discharge in the passages via electrodes inserted in the block. The laser is so formed is of a type, such as the He-Ne, that emits radiation of 6328 Å in each direction so that there is a clockwise and a counterclockwise beam in the system.

It has been determined that the performance of a magneto-optic biasing element in a ring-type laser gyro depends upon both high reflectivity and a maximum Kerr magneto-rotation. By placing the reflective magneto-optic element at near-grazing incidence, full advantage is taken of the dependence of the magneto-optical properties upon angle of incidence. Placing the magneto-optic element at a grazing angle exploits the fact that the magneto-optic figure-of-merit (defined as the reflectivity of the polarized beam times the amount of Kerr magneto-optic rotation) increases very rapidly at large angles of incidence. The magneto-optic element is formed by evaporating a thin film of iron (Fe) or other appropriate magnetic metal onto $SiO_2$ disk. This magneto-optic film is then overcoated with appropriate layers of dielectric films to enhance the Kerr phase shift, diminish the differential reflectivity and enhance the total reflectivity. The thin-film of iron is evaporated onto the disk such that the magnetization vector lies in the plane of the mirror and its polarity is alternately switched back and forth by an AC magnetic field. The ideal condition for operation of a magneto-optic element in a ring laser gyro is for the material to always be in a saturated magnetic sense. This condition provides the highest immunity to applied field changes, while at the same time, giving the greatest magneto-optic effects. If the magnetic-optic element has a specific direction which is more easily magnetized, then the element should be magnetized along the easy direction. Thus, the materials used in a Kerr magneto-optic element should be easily magnetically saturable in low applied fields, should have a high magnetization, should exhibit anisotropy constraining the moment to lie in the plane of the element, and should allow the polarity of the magnetization to be quickly reversed.

It has been determined that a thin film of Fe, Ni, or Co, as well as permalloy, compositions of $Ni_{0.75} Fe_{0.25}$ (low magnetostriction) and $Ni_{0.68} Fe_{0.32}$ (low anisotropy) may be applied to $SiO_2$ to form the mirror surface. Also a thin film of iron may be placed upon a thicker permalloy underlayer. The latter structure combines the desirable square loop magnetic switching properties of permalloy with the high magneto-optic performance of iron.

Figure 2:
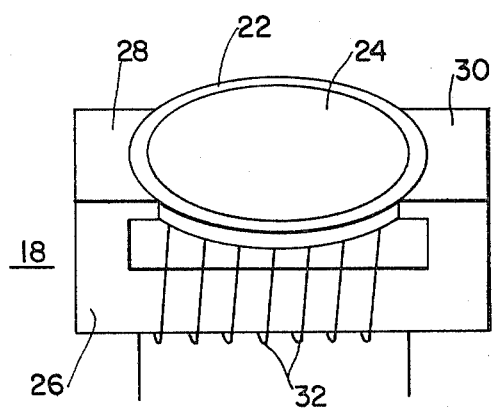
FIG. 2 illustrates the reflective surface.
Figure 3:
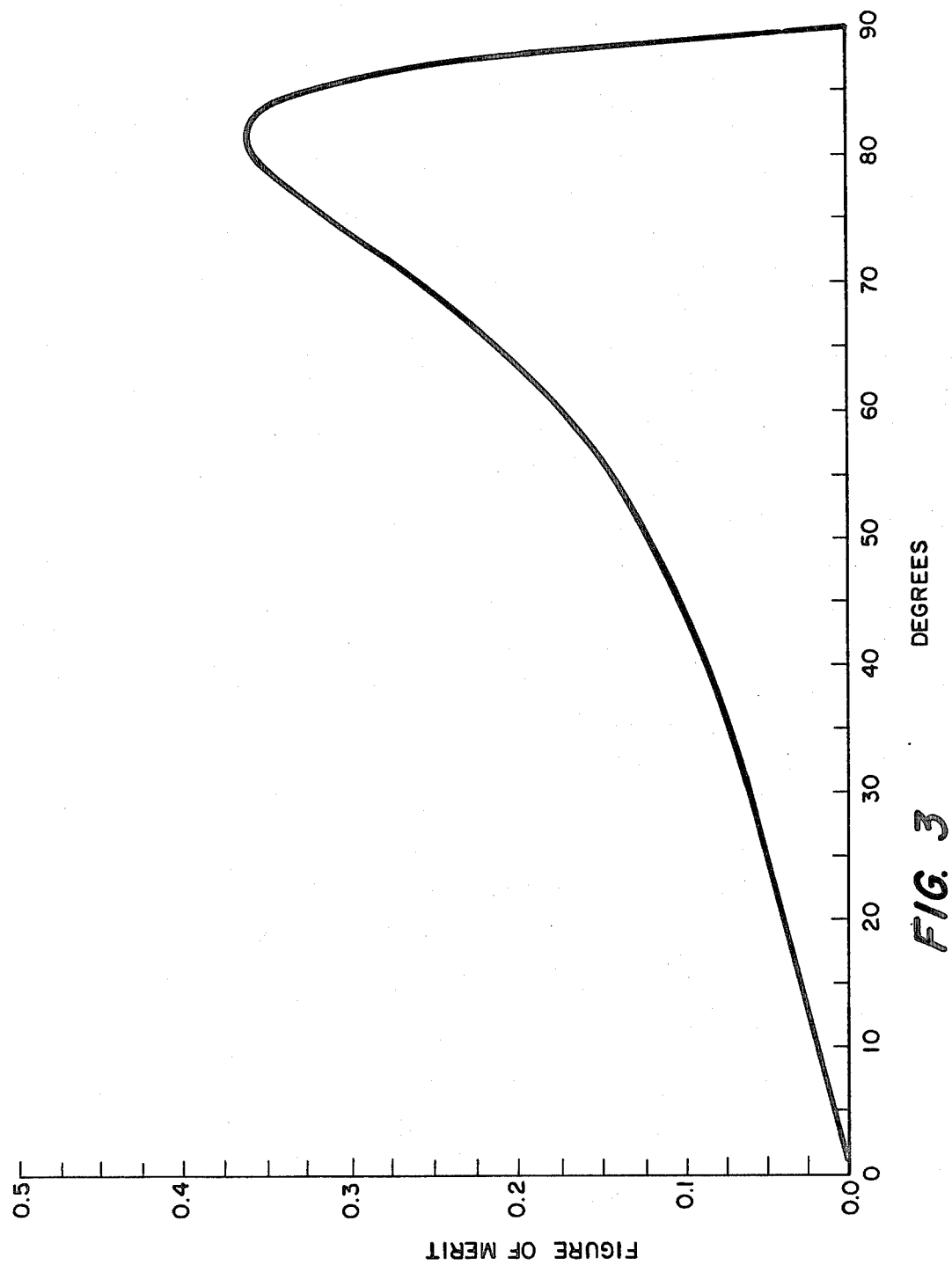
FIG. 3 illustrates a magneto-optic Figure-of-Merit curve for different angles of reflectivity.

The magneto-optic element (see FIG. 2) includes the substrate 22 with the thin film 24 thereon placed in a means 26 for producing alternating magnetic lines of force. The means 26 is shown as an electro magnetic having pole pieces 28 and 30 and a coil 32 wound on the pole connector. The ends of the coil are connected to an AC source which produces a magnetic field of 70 oersteds.

The Kerr effect depends upon the relative orientation of the reflecting surface, the plane of incidence of the radiation and the direction of the magnetization. Three different effects are: (1) polar—the direction of magnetization is perpendicular to the surface; (2) longitudinal—the direction of the magnetization is parallel with with the surface and parallel to the plane of incidence; (3) transverse—the direction of the magnetization is parallel with the surface but perpendicular to the plane of incidence. The preferred arrangement is when the magnetic lines of force are aligned along the easy axis of the film. In this arrangement the reflective surface is least sensitive to external magnetic fields.

It has been determined that by placing the reflective surface at a grazing angle, the reflectivity and the magnetically induced phase shift are increased. Therefore the laser gyro is more efficient and gives a better performance with the reflective surface placed between the corner reflectors and at a grazing angle.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. In an improved ring laser including, in combination, means for radiating and reflecting clockwise and counterclockwise laser beams around said ring laser for biasing said beams, the improvement comprising:
   a magneto-optic mirror element placed between two corner, beam-reflecting surfaces so that the beams impinge on said element at near-grazing incidence.

2. The improvement in a ring laser as claimed in claim 1 wherein:
   said ring laser is formed as a triangle.

3. The improvement in a ring laser as claimed in claim 2 wherein:
   said magneto-optic mirror element includes a reflective film surface selected from the group consisting of Fe, Ni, Co, $Ni_{0.75}Fe_{0.25}$, and $Ni_{0.68}Fe_{0.32}$ on a subtrate.

4. The improvement in a ring laser as claimed in claim 2 wherein:
   said magneto-optic mirror element includes a reflective film surface of Fe on a $SiO_2$ substrate.

5. The improvement in a ring laser as claimed in claim 4 wherein:
   said film of Fe has a thickness of from about 200 Å to about 800 Å.

6. The improvement in a ring laser as claimed in claim 5 wherein:
   said film of Fe is aligned in said magneto-optic mirror element such that the net magnetization is directed along the easy-axis of said film.

7. The improvement in a ring laser as claimed in claim 1 wherein:
   the grazing angle of said beams is from 3 degrees to about 25 degrees.

* * * * *